US010132708B2

(12) United States Patent
Warkotsch et al.

(10) Patent No.: US 10,132,708 B2
(45) Date of Patent: Nov. 20, 2018

(54) CLAMPING DEVICE HAVING HUB CENTERING

(71) Applicant: HAWEKA AG, Burgwedel (DE)

(72) Inventors: Dirk Warkotsch, Burgwedel/Wettmar (DE); Tilo Janz, Kempten (DE)

(73) Assignee: HAWEKA AG, Burgwedel (DE)

( * ) Notice: Subject to any disclaimer, the term of this patent is extended or adjusted under 35 U.S.C. 154(b) by 370 days.

(21) Appl. No.: 14/427,094

(22) PCT Filed: Aug. 1, 2013

(86) PCT No.: PCT/EP2013/002288
§ 371 (c)(1),
(2) Date: Apr. 22, 2015

(87) PCT Pub. No.: WO2014/037074
PCT Pub. Date: Mar. 13, 2014

(65) Prior Publication Data
US 2015/0241294 A1 Aug. 27, 2015

(30) Foreign Application Priority Data

Sep. 10, 2012 (DE) .................. 10 2012 017 789

(51) Int. Cl.
B23B 31/175 (2006.01)
G01M 1/04 (2006.01)
(52) U.S. Cl.
CPC ....... G01M 1/045 (2013.01); B23B 31/16195 (2013.01); Y10T 279/26 (2015.01)
(58) Field of Classification Search
CPC ................. G01M 1/045; Y10T 279/26; B23B 31/16195; B23B 31/16225; B23B 31/16229
(Continued)

(56) References Cited

U.S. PATENT DOCUMENTS 1,181,355 A * 5/1916 Stevens ............. B23B 31/16287
279/2.16
1,548,227 A 8/1925 Hamersveld
(Continued)

FOREIGN PATENT DOCUMENTS

DE 19724523 C1 6/1998
DE 102004044287 B3 8/2005
FR 1497504 A * 10/1967 ............. B23B 31/18

OTHER PUBLICATIONS

International Search Report (including translation) for corresponding International Patent Application No. PCT/EP2013/002288, dated Mar. 3, 2014.
(Continued)

Primary Examiner — Sunil K Singh
Assistant Examiner — Paul M Janeski
(74) Attorney, Agent, or Firm — Jason H. Vick; Sheridan Ross, PC

(57) ABSTRACT

What is shown and described is a clamping device (1) with hub centering for attachment of an automobile wheel to the shaft of a balancing machine, with a contact flange (2) with several centering elements (3) guided in a radially moveable manner on the contact flange (2) for centering engagement in a centering hole of the rim, and with a clamping sleeve (4) guided in a moveable manner axially to the contact flange (2), wherein the clamping sleeve (4) and the centering elements (3) are kinematically coupled such that an axial movement of the clamping sleeve (4) leads to a radial movement of the centering elements (3). According to the invention, a provision is made that at least one tension lever (16) connected in an articulated manner to the clamping sleeve (4) and a centering element (3) is provided for the kinematic coupling of clamping sleeve (4) and centering element (3).

9 Claims, 6 Drawing Sheets

Figure 1:
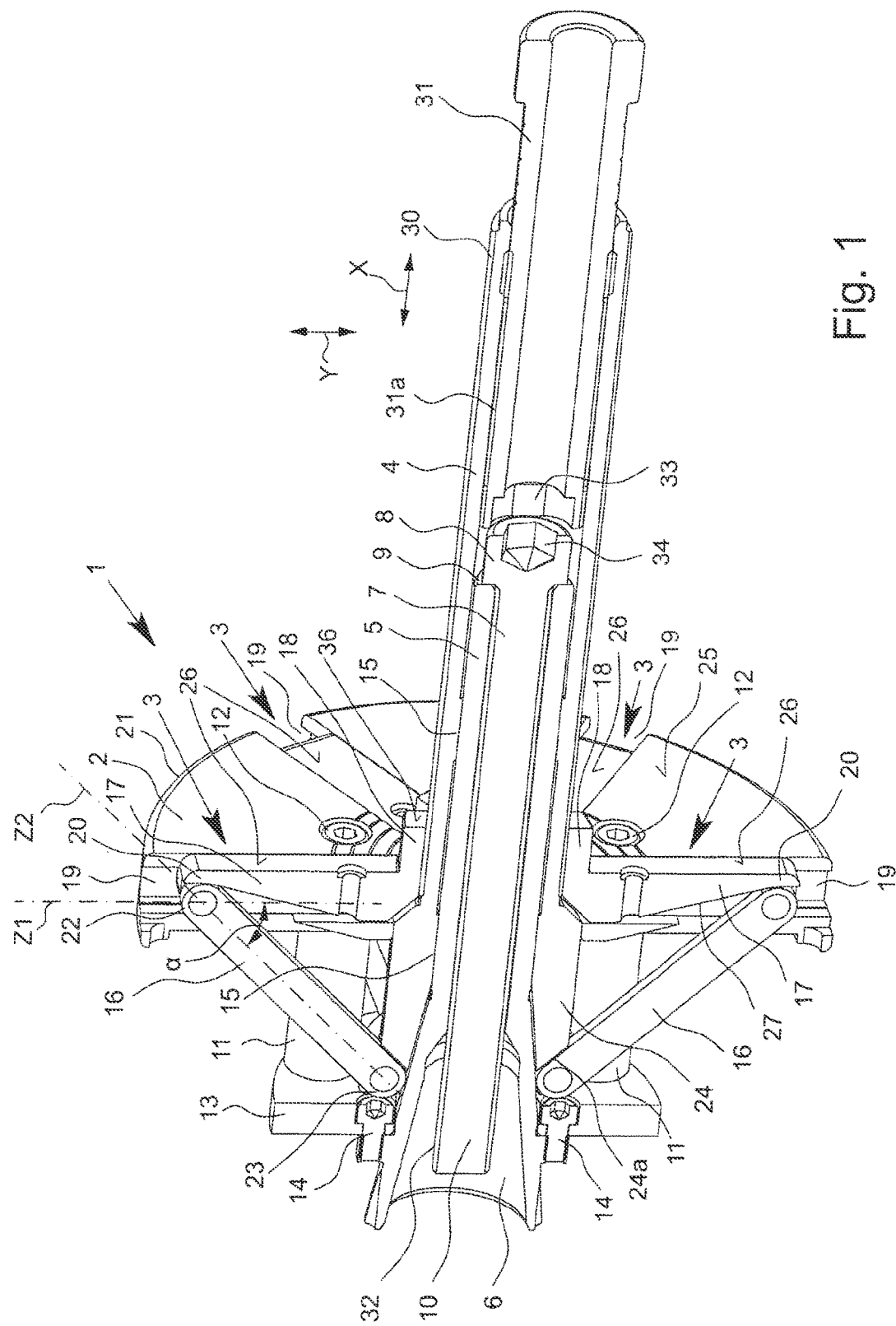

(58) Field of Classification Search
IPC .................................................... G01M 1/045
See application file for complete search history.

(56) References Cited

U.S. PATENT DOCUMENTS

| | | | | |
|---|---|---|---|---|
| 1,839,401 | A | * | 1/1932 | Lewis ............... B23B 31/16195 279/118 |
| 1,959,081 | A | * | 5/1934 | Le Jeune ................ B23Q 3/08 279/109 |
| 2,277,128 | A | * | 3/1942 | Miller .................... B31D 1/005 229/5.5 |
| 2,784,002 | A | | 3/1957 | Stace et al. |
| 3,131,946 | A | * | 5/1964 | Newhouser ......... B23B 31/1261 279/133 |
| 3,919,889 | A | * | 11/1975 | Mitchell ............... G01M 1/045 73/485 |
| 5,292,139 | A | | 3/1994 | Gaillard |
| 5,562,007 | A | * | 10/1996 | Seymour ............... B23B 31/185 279/106 |
| 6,481,281 | B1 | | 11/2002 | Gerdes |
| 2002/0015632 | A1 | | 2/2002 | Warkotsch et al. |
| 2006/0055125 | A1 | | 3/2006 | Ohnesorge |
| 2006/0266105 | A1 | | 11/2006 | Stieff |

OTHER PUBLICATIONS

Written Opinion for corresponding International Patent Application No. PCT/EP2013/002288, dated Mar. 3, 2014.
International Preliminary Report on Patentability (including translation) for corresponding International Patent Application No. PCT/EP2013/002288, dated Jan. 6, 2015.

\* cited by examiner

CLAMPING DEVICE HAVING HUB CENTERING

CROSS REFERENCE TO RELATED APPLICATIONS

This application is a national stage application under 35 U.S.C. 371 of PCT Application No. PCT/EP2013/002288 having an international filing date of 1 Aug. 2013, which designated the United States, which PCT application claimed the benefit of German Application No. 10 2012 017 789.5 filed 10 Sep. 2012, each of which are incorporated herein by reference in their entirety.

The invention relates to a clamping device with hub centering for attachment of an automobile wheel to the shaft of a balancing machine, with a contact flange for contacting a rim of an automobile wheel, with several centering elements guided on the contact flange in a radially moveable, preferably slidable manner for a centering engagement in a hub centering hole of the rim and with a guided clamping sleeve that can be moved, preferably slid, axially to the contact flange, with the clamping sleeve and the centering elements being kinematically coupled or operatively connected such that an axial movement, particularly displacement, of the clamping sleeve leads to a coupled radial movement, particularly displacement, of all centering elements.

A quick-action clamping device with hub centering for attachment of an automobile wheel to the shaft of a balancing machine is known from DE 10 2004 044 287 B3. The known quick-action clamping device has a flange that is arranged in a fixed manner on the shaft for frictionally engaging with a rim of the automobile wheel and clamping means for tightening the rim against the flange. The clamping means can be formed by a clamping nut, particularly a quick-action clamping nut. Moreover, a cone arrangement is provided that has an inner hole for sliding onto the shaft of the balancing machine and an outer centering surface for engaging in the centering hole of the rim. The cone arrangement has a cone with a tube part extending from its tip that is arranged with its inner wall in an axially displaceable manner on the shaft or on an extension thereof and on whose outer wall the clamping means for tightening the rim against the flange is supported. Moreover, the cone arrangement has an outer centering part with a cylindrical outer surface for engaging in a hub centering hole of the rim and with a conical inner surface in which the cone of the cone arrangement engages with its conical outer surface, with the centering part being formed by radially moveable centering elements separated from each other. The centering elements consist of radially extending guide parts that are held in a radially displaceable manner on the interior of the flange. The guide parts have the shape of radial flange parts that are guided in radial slots in the flange, with the centering elements biased by spring means inwardly in the radial direction. An elastic ring can be provided as a spring means.

During clamping of the rim, the inner surface of the centering hole of the rim is first placed onto the cylindrical outer surface of the centering elements, with the cylindrical outer surface still having a smaller diameter than the inner surface of the centering hole due to the force of the spring means. Thereafter, the clamping nut is screwed on until the rim is tightened against the flange. The compressive forces cause the tube part of the cone arrangement and thus also the cone to be pulled in the direction of the rim, so that the conical outer surface of the cone presses the radially moveable centering elements of the cone arrangement outward until the cylindrical outer surface of the centering elements abuts in a centering manner against the inner surface of the rim in the area of the centering hole. As a result, the force applied to the flange during tightening of the rim is simultaneously used for the centering of the wheel, with the integrated hub centering of the known clamping device being pulled apart.

It is the object of the present invention to develop the clamping device known from DE 10 2004 044 287 B3 and to make a clamping device available which further facilitates the centering and tightening of the rim against the flange while particularly enabling the transfer of a high level of centering force in a simple manner.

The abovementioned object is achieved in a clamping device of the type mentioned at the outset through the provision of at least one tension lever connected in an articulated manner to the clamping sleeve and a centering element for the kinematic coupling of clamping sleeve and centering element. Preferably, a lever connection between the clamping sleeve and the centering element is embodied through an opening in the contact flange, so that the tension lever is guided through the back side of the contact flange facing away from the rim. This enables the clamping device according to the invention to have a very compact construction. At the same time, reliable guiding of the centering element on the contact flange is ensured. In addition, by virtue of the opening in the contact flange, it is possible to attach the tension lever with one end on the radially outside end of the centering element.

According to the invention, the coupling between the clamping sleeve and the centering elements is not achieved by means of a cone arrangement, as is described in DE 10 2004 044 287 B3, but rather by means of at least one tension lever that is connected according to the toggle lever principle to the centering element on the one side and the clamping sleeve on the other. The (toggle lever) connection of clamping sleeve and centering element provided according to the invention enables the transfer of greater centering forces during tightening of the rim against the contact flange, with the tightening of the rim against the flange nevertheless being possible with little effort.

The clamping device according to the invention preferably has a first tube part that can be connected in a fixed manner to the shaft of the balancing machine, with the contact flange particularly being connected to the tube part so as not to be moveable in the axial direction and the clamping sleeve being guided on the tube part so as to be axially moveable or displaceable over at least one sliding section axial, for example. Through the movement of the clamping sleeve in the axial direction relative to the contact flange fixed in a stationary manner to the tube part, a forced actuation of the centering element occurs as a result of the lever connection between the centering element and the clamping sleeve, with the centering element being displaced radially.

Preferably, four to eight, particularly six, centering elements are provided in order to enable the uniform transfer of the centering force required to center the rim. According to the invention, the centering elements of the clamping device according to the invention can be displaced simultaneously and coupled in the radial direction by the same amount through movement of the clamping sleeve.

In one preferred embodiment, a further provision is made that each centering element is connected to the clamping sleeve by means of at least one, preferably only one, tension lever. The kinematic coupling of the clamping sleeve with each centering element, each via at least one tension lever, contributes to the high level of stability of the clamping device according to the invention and leads to a low mechanical stress on the tension lever connections. Alternatively, several centering elements can also be coupled kinematically with each other via a coupling means, such as a rubber ring or the line, with just one tension lever being sufficient in principle in order to enable a coupled displacement of all centering elements.

For guiding the centering elements, the contact flange can have radial grooves or groove-like recesses on the side of the rim extending over the entire contact flange in the radial direction. The radial grooves extend outward in a radial direction from an inside edge of the contact flange bordering a central through-hole for the clamping sleeve to an outer edge of the contact flange and are open toward the outside, with the centering elements being shifted outward as the axial displacement of the clamping sleeve in the direction of the rim increases, i.e., away from the contact flange, and preferably protrude outwardly with the radially outside ends over the circumferential edge of the contact flange when a maximum centering position is reached. In the maximum centering position, a maximum distance is then achieved between the centering elements and the clamping sleeve.

The radial grooves can particularly be T-shaped in order to ensure reliable guiding of the commensurately complementarily designed centering elements. The centering elements are thus also held on the contact flange in an undetachable manner.

The clamping angle between a tension lever and a centering element can be between 10° and 20°, preferably about 15°, when the centering element is arranged in the maximum centering position, i.e., when a maximum possible outward radial displacement of the centering element is reached. In contrast, if the centering element is arranged in the minimum centering position of the centering element, i.e., when a minimum possible radial displacement is reached in which the distance between the centering element and the clamping sleeve assumes a minimum value, [it] can be between 30° and 60°, preferably about 45°. The clamping angle is based in each case on the middle longitudinal axis of a tension lever and the middle longitudinal axis of the centering element coupled with the respective tension lever and/or on a radial plane on which the contact surface of the contact flange lies. The specification of a maximum clamping angle and/or of a minimum clamping angle corresponding to the abovementioned angular ranges ensures both the transfer of sufficiently high centering force via the tension lever to the centering elements and the sufficiently high stability of the toggle lever system with simultaneously low effort required for tightening the rim against the contact flange.

The clamping device according to the invention preferably enables the continuously variable centering of different rims with a center hole diameter from 30 to 120 mm, preferably from 50 to 100 mm, particularly from 54 to 115 mm, thus covering all common rim types, particularly in the area of passenger cars.

Moreover, a provision is preferably made that each centering element has a guide section guided into the radial grooves of the contact flange and a centering section lying radially on the inside with respect to the guide section bent downward in the axial direction toward the rim for centering engagement in the middle centering hole of the rim, with it being possible for an outer surface of the guide section and a contact surface of the contact flange to be aligned with each other or for the contact surface of the contact flange to protrude forward with respect to the outer surface of the guide section. In the first-mentioned embodiment, the outer surfaces of the guide sections and the contact surface of the contact flange come to abut jointly against the rim in the tightened centering state of the rim. If the contact surface of the contact flange protrudes forward with respect to the outer surfaces of the guide sections, the guide sections of the centering elements do not come in contact with the rim upon radial displacement of the centering elements, so that little effort is required to tighten and center the rim.

If the radial grooves have a special, particularly T-shaped, cross-sectional profile, the centering element can have a complementary cross-sectional geometry in the area of its elongated guide section. This ensures stable and reliable guiding of the centering elements on the contact flange.

In an especially preferred embodiment, the tension lever is hinged with one end on the radially outside end of the centering element or on the radially outside end of its guide section and with the other end on the clamping sleeve. On the radially outside end, the centering element or the guide section can have a chamfer on the side facing away from the rim, with the tension lever abutting against the chamfer in the maximum centering position of the centering element and being supported against the centering element. Further radial splaying of the centering elements is then no longer possible. This contributes to the high level of stability of the toggle lever system according to the invention. What is more, the tension lever can be guided through an oblong opening in the contact flange to the back side of the contact flange facing away from the rim. This makes it possible for the clamping device according to the invention to have a very compact construction.

As will readily be understood, the previously described features involving the tension lever and the centering element as well as the arrangement thereof are preferably implemented similarly in all tension lever—centering element units.

As already described above, a first tube part that can be connected in a fixed manner to the shaft of the balancing machine can be provided, with the contact flange being connected in a fixed manner to the first tube part and the clamping sleeve being guided over at least one sliding section, preferably several sliding sections, on the first tube part in an axially moveable manner. Within the clamping sleeve, a displacement means that can be moved in the axial direction relative to the clamping sleeve and supported against the first tube part can be provided for the presetting of the centering position of the centering elements, with a second tube part that can be screwed into the clamping sleeve being particularly advantageous as a displacement means. With the displacement means, it is easily possible to set the centering elements, or more precisely the centering sections thereof, through radial displacement of the centering elements to a diameter that is slightly smaller than the centering diameter of the centering hole of the respective rim. This reduces the effort required for centering and fixing the rim on the contact flange.

Moreover, as is known from the prior art, a screw passing through the first tube part can be provided for connecting the clamping device to the shaft of the balancing machine. According to the invention, a provision is also preferably made that am external thread of the screw and an external thread of the second tube part have the same thread pitch, so that the screw and the second tube part can be displaced jointly in the axial direction. A drive profile section on the screw head, for example an internal hexagon section, can then be accessible to a screw wrench through the second tube part, with it being possible for the second tube part to have a wrench opening for the screw wrench on the inner front side whose profile corresponds to the drive profile on the screw head. As a result, the fastening screw and the second tube part can thus simultaneously be screwed in or out with a wrench, which simplified assembly.

Moreover, a preferred embodiment of the clamping device according to the invention makes a provision that the clamping sleeve has an external thread section for screwing on a clamping screw, with the distance in the axial direction between the external thread section and axial front surfaces at the centering sections of the centering elements when the centering elements are arranged in the maximum centering position being less than 40 mm, preferably between 25 to 35 mm. It is thus also possible to easily center and clamp rims with a large center hole diameter with the clamping device according to the invention.

The abovementioned aspects and features of the present invention and the aspects and features of the present invention described below can be implemented independently of one another but also in any combination. Additional advantages, features, characteristics and aspects of the present invention follow from the following description of a preferred embodiment on the basis of the drawing.

Figure 2:
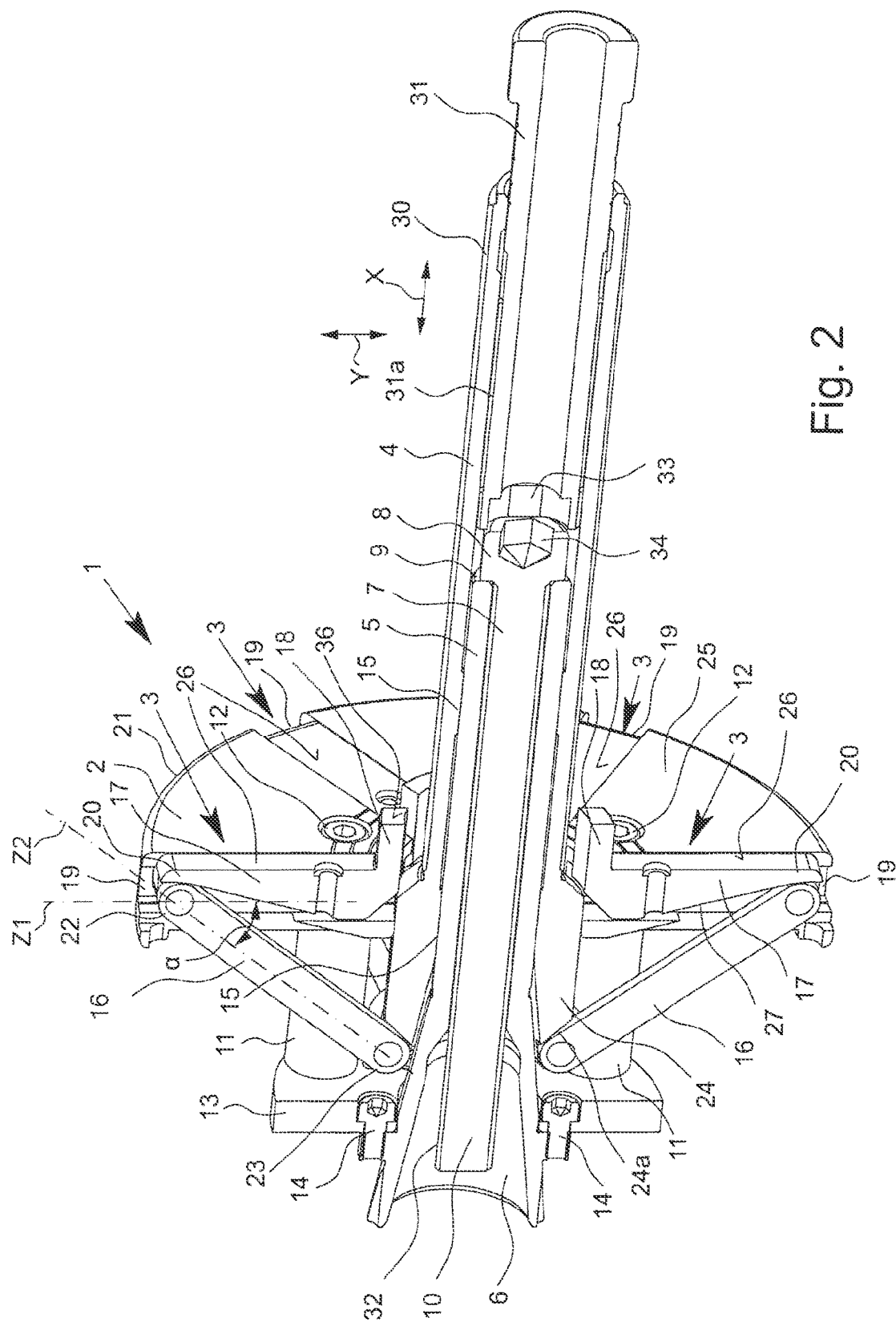
Figure 3:
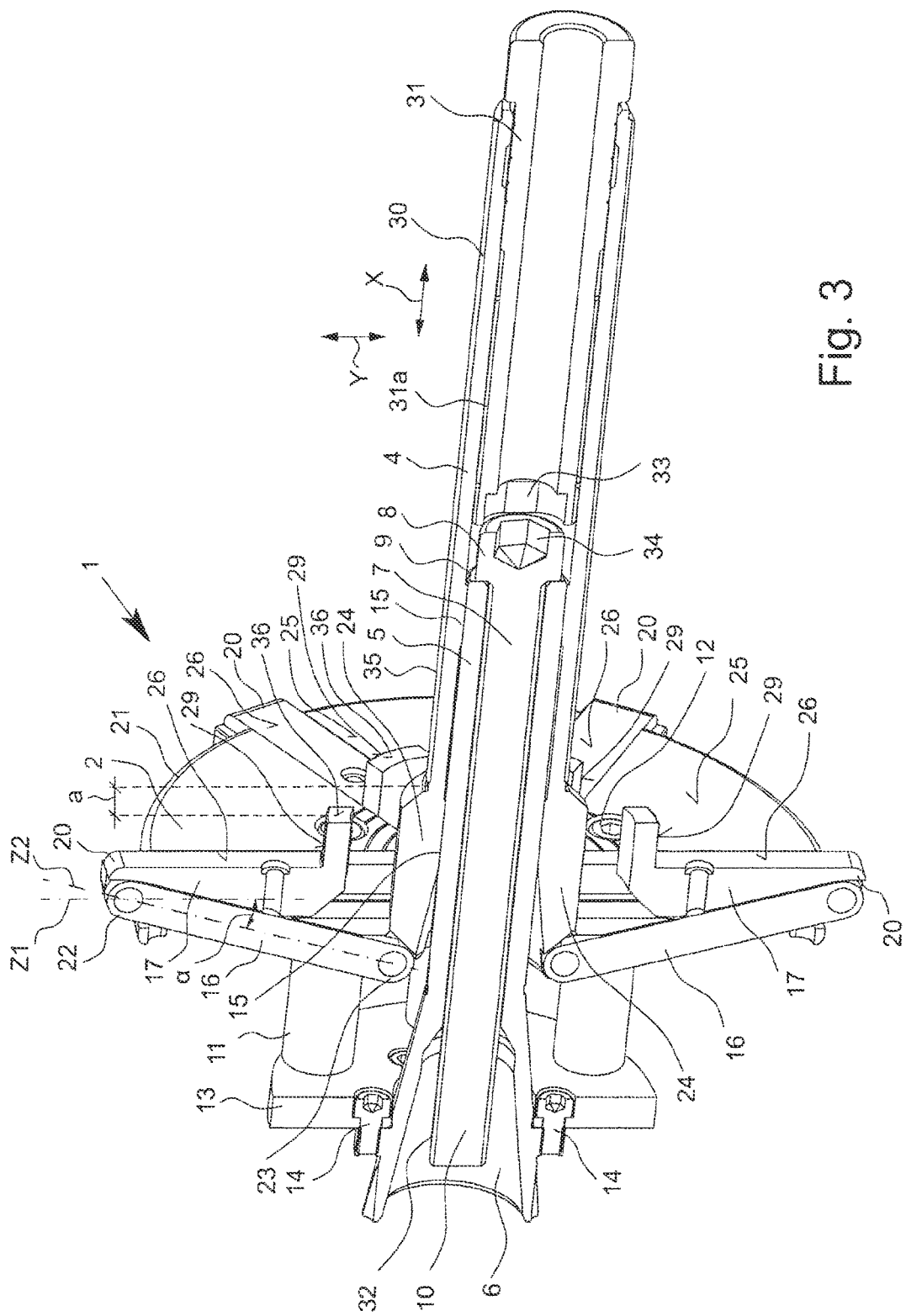
Figure 4:
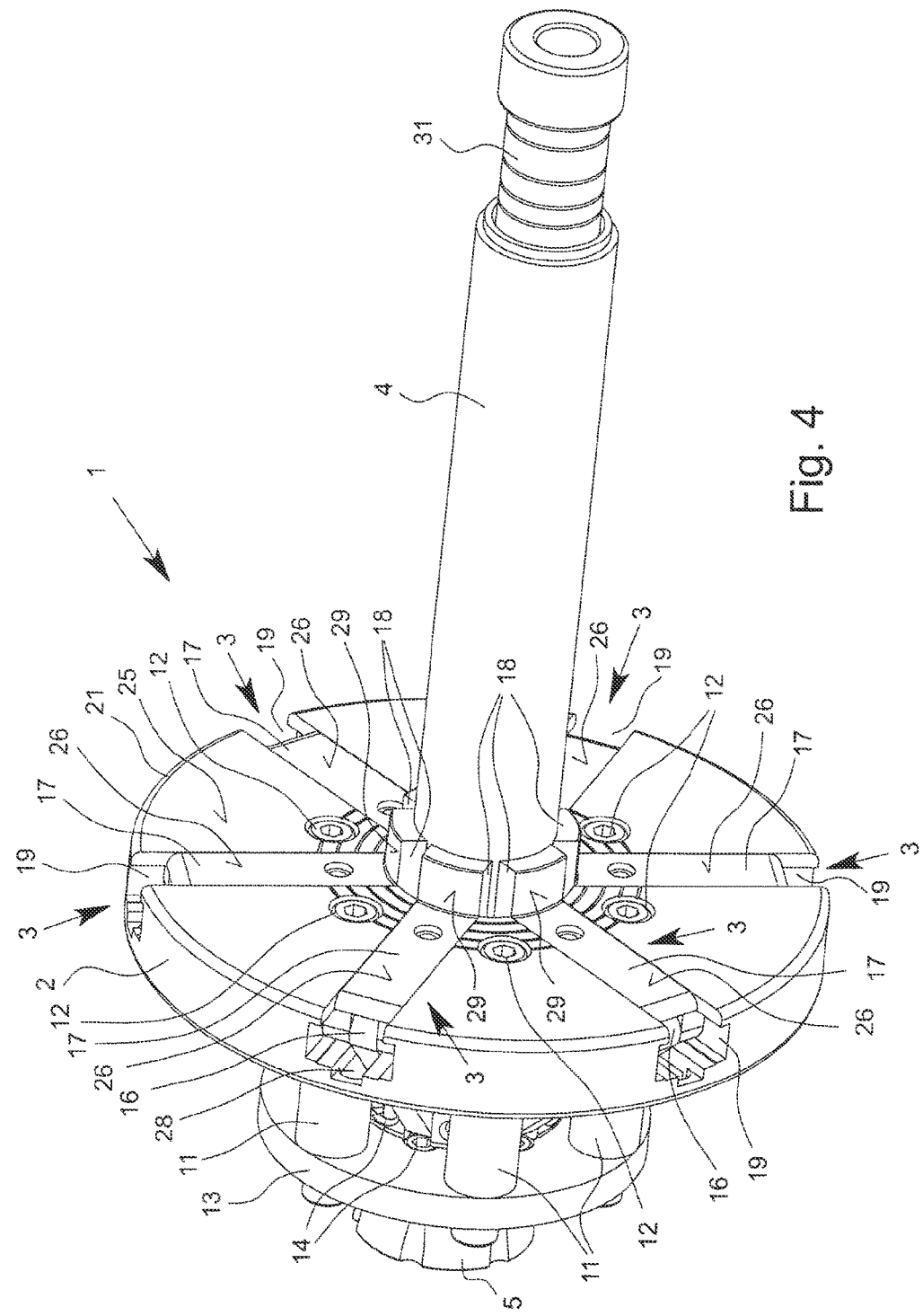
Figure 5:
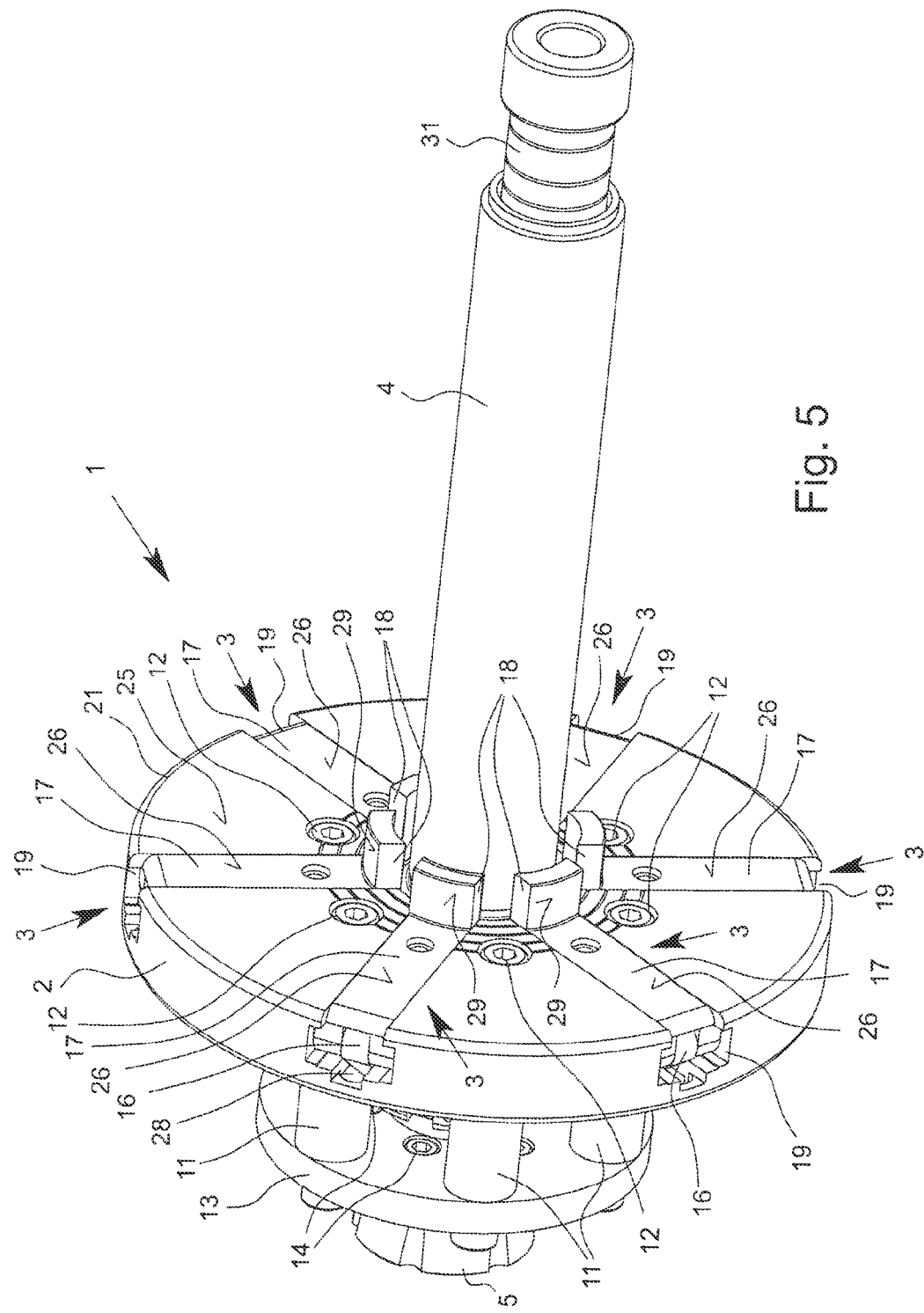
Figure 6:
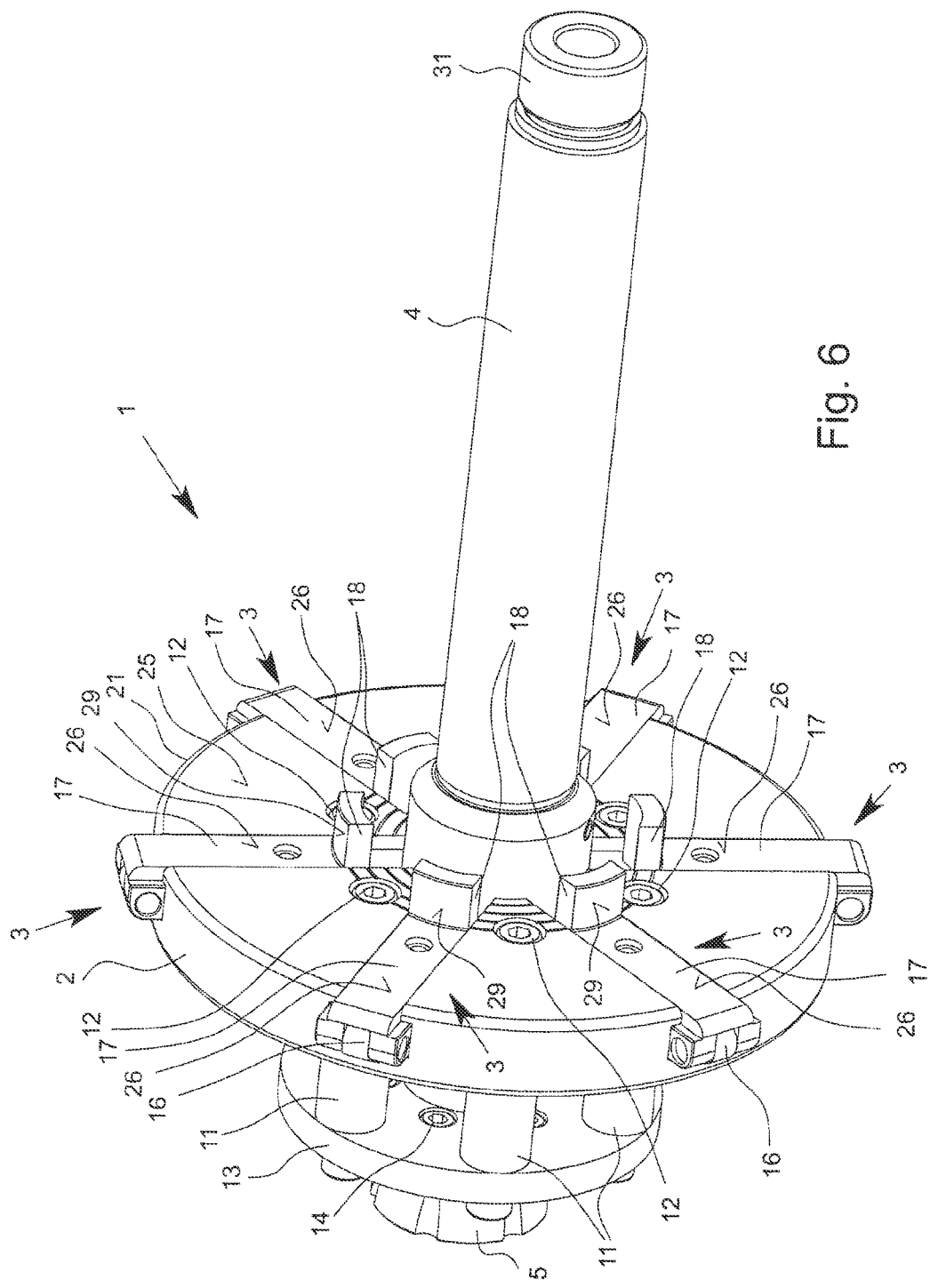

FIGS. 1 to 3 show schematic sectional view of a clamping device according to the invention when the centering elements of the clamping device are arranged in a minimum centering position (FIG. 1), in a middle centering position (FIG. 2) and in a maximum centering position (FIG. 3), and FIGS. 4 to 6 show perspective views of the clamping device shown in FIGS. 1 to 3 when the centering elements are arranged in the minimum centering position (FIG. 4), in a middle centering position (FIG. 5) and in the maximum centering position (FIG. 6).

FIGS. 1 to 6 show a clamping device 1 with hub centering for the attachment of a rim of an automobile wheel (not shown) on a shaft (also not shown) of a balancing machine. The clamping device 1 has a contact flange 2 for contacting the rim of the automobile wheel and several centering elements 3 moveably guided on the contact flange 2 in the radial direction Y for centering engagement in a middle centering hole of the rim. Moreover, a clamping sleeve 4 moveably guided in the axial direction X relative to the contact flange 2 is provided, with the clamping sleeve 4 and the centering elements 3 being kinematically coupled such that an axial movement of the clamping sleeve 4 leads to a simultaneous coupled movement of all centering elements 3 in the radial direction Y.

The clamping device 1 also has a first tube part 5 that can be connected in a fixed manner to the shaft of the balancing machine, with an inner cone 6 that is complementary to a cone of the shaft of the balancing machine. Using a screw 7 that extends in the tube part 5 and abuts with its screw head 8 against an axial front surface 9 of the tube part 5, the tube part 5 can be connected to the cone of the shaft of the balancing machine. For this purpose, the screw 7 is screwed using a wrench (not shown) with its threaded end 10 facing away from the screw head 8 into an internal thread in the cone of the shaft, thereby holding the tube part 5 firmly on the shaft.

The contact flange 2 screwed to a ring part 13 by means of spacers 11 and screws 12, with the ring part 13 being fixed in turn to the tube part 5 with screws 14, specifically on the end of the tube part 5 facing toward the shaft of the balancing machine in the middle area of the inner cone 6. The contact flange 2 is connected to the tube part 5 so as to be immovable in the axial direction X and in the radial direction Y.

The clamping sleeve 4 has two slide bearing sections 15, so that the clamping sleeve 4 is guided on the outer lateral surface of the tube part 5 so as to be moveable in the axial direction X.

As can also be seen in FIGS. 1 to 6, tension levers 16 are provided for the kinematic coupling of the clamping sleeve 4 with the centering elements 3, with each centering element 3 being connected in an articulated manner to the clamping sleeve 5 by means of a tension lever 16. The tension levers 16 and the centering elements 3 form a toggle lever system, with a movement of the clamping sleeve 4 in the axial direction X relative to the contact flange 2 leading to a coupled joint displacement of all centering elements 3 in the radial direction Y. This can be seen through a comparison of FIGS. 1 to 3 and 4 to 6. By virtue of the toggle lever system, the depicted clamping device enables the transfer of a high centering force, with the force applied against the contact flange 2 when tightening the rim being simultaneously used for centering the rim. During tightening of the rim against the contact flange 2, the clamping sleeve 4 is pulled in the direction of the rim with a clamping nut (not shown), so that the centering elements 3 are displaced outwardly, which ultimately leads to the centering and fixing of the rim. It is possible here to center different rims with different center hole diameters in a continuously variable manner.

The depicted embodiment of the clamping device 1 has six centering elements 3. Each centering element 3 is formed by a guide section 17 and a centering section 18 angled down with respect to the guide section 17 in the axial direction toward the rim. The guide sections 17 are moveably guided in T-shaped radial grooves 19 of the contact flange 2 and have a complementary cross-sectional geometry, so that the centering elements 3 are guided on the contact flange 2 so as to be displaceable in the radial direction Y and held on the contact flange 2 in the axial direction X in an undetachable manner. The centering elements 3 can be moved from a minimum centering position, which is shown in FIGS. 1 and 4, to a maximum centering position, which is shown in FIGS. 3 and 6, through axial displacement of the clamping sleeve 4. In the maximum centering position, the ends 20 of the centering elements 17 extend beyond the circumferential edge 21 of the contact flange 2 outwardly in the radial direction. Moreover, upon reaching the maximum centering position, the centering sections 18 are spaced maximally from the clamping sleeve 4 and adjusted to a center hole diameter that is as large as possible.

Each tension lever 16 is connected at its outer end 22 in an articulated manner to the end 20 of a centering element 3. At the inner end 23, each tension lever 16 is hinged at the rear end of the clamping sleeve 4 and abuts in the minimum centering position of the centering elements 3 against a bevel 24a of a thickening 24 of the clamping sleeve 4. This is shown in FIG. 1. This makes simple displacement and a high transfer of force possible in the toggle system formed by the tension levers 16 and the centering elements 3.

As can be seen from FIG. 1, the clamping angle α between each tension lever 16 and the respectively coupled centering element 3 can preferably be about 45° when the centering elements 3 are arranged in the minimum centering position, i.e., in the minimally radially displaced position in the outward direction. It can be seen from FIG. 3 that the clamping angle α is preferably about 15° when the centering element 3 is arranged in the maximum centering position, i.e., in the maximally radially displaced position in the outward direction. Each clamping angle α can be set in a continuously variable manner between the abovementioned angular ranges at the maximum centering position and minimum centering position of the centering elements. In the context of the present disclosure, the clamping angle α respectively relates to the middle longitudinal axis Z1 of a centering element 3 and the middle longitudinal axis Z2 of a tension lever 16.

As can also be seen from FIGS. 1 to 6, flat outer surfaces 26 can be aligned on the guide sections 17 and the contact surface 25 of the contact flange 2. The contact surface 25 and the outer surfaces 26 of the centering elements 3 then abut jointly against the rim in the centered fixed state of the rim.

As can also be seen from FIGS. 1 to 3, the centering element 3 can have a chamfer 27 on the side facing away from the rim against which the associated tension lever 16 comes to rest in the maximum centering position of the centering element 3. This is shown in FIG. 3. The tension lever 16 is guided through an oblong opening 28 in the contact flange 2 and connected at its end 23 to the clamping sleeve 4.

Together, the centering sections 18 of the centering elements 3 form a cylindrical outer surface for centering engagement in a middle centering hole of the rim. In state in which it is centered and tightened against the contact flange 2, the rim abuts with its front side against the contact surface 25 of the contact flange 2, while, at the same time, the centering sections 18 embodied as ring segments abut with circular arch-shaped outer surfaces 29 against an inner surface of the centering hole.

For the clamping of the rim, a clamping nut is screwed onto an external thread section 30 of the clamping sleeve 4, with the compressive forces causing the clamping sleeve 4 to be pulled in the direction of the rim or, in the drawing, to the right relative to the contact flange 2, so that the tension levers 16 push the centering elements 3 radially to the outside until the outer surfaces 29 of the centering sections 18 abut in a centering manner against the inner surface of the centering hole.

Within the clamping sleeve 4, a second tube part 31 is provided that can be moved in the axial direction X relative to the clamping sleeve 4 and supported against the first tube part 5, with the second tube part 31 having an external thread section 31a and the clamping sleeve 4 having a corresponding internal thread section, and with the second tube part 31 being screwed into the clamping sleeve 4. The second tube part 31 can be screwed by hand into the clamping sleeve 4 in order to enable quick adjustment of the centering elements 3 for presetting to a certain center hole diameter of the rim. The second tube part 31 also has a wrench opening 33 at the front-side inner end, so that a wrench can be inserted from the outside through the second tube part 31 and the wrench opening 33 into an internal hexagon section 34 of the screw 7. The wrench opening 33 also has a hexagonal contour. If an external thread 32 of the screw 7 and the external thread section 31a on the second tube part 31 have the same thread pitch, the screw 7 and the second tube part 31 can be jointly adjusted in the axial direction X by means of the wrench.

In order to also enable the tightening and centering of rims with a large center hold diameter against the contact flange 2, the distance a is preferably less than 30 mm if the centering elements 3 are arranged in the maximum centering position between the external thread section 30 of the clamping sleeve 4, which preferably extends to the thickened area 24, and axial front surfaces 36 on the centering sections 18 of the centering elements 3 in the axial direction X. This is shown in FIG. 3.

The invention claimed is:

1. A clamping device with hub centering for attachment of an automobile wheel to the shaft of a balancing machine, with a contact flange with several centering elements guided in a radially moveable manner on the contact flange for centering engagement in a centering hole of the rim of the automobile wheel, and with a clamping sleeve guided in a moveable manner axially to the contact flange, wherein the clamping sleeve and the centering elements are kinematically coupled such that an axial movement of the clamping sleeve leads to a radial movement of the centering elements, wherein at least one tension lever hinged on the clamping sleeve and a centering element for the kinematic coupling of clamping sleeve and centering element, with the clamping sleeve able to be pulled in the direction of the rim when tightening the rim against the contact flange and the centering element thus able to be displaced outwardly, and with the centering element having a centering section with a radially outside outer surface for abutting in a centering manner against the inner surface of the centering hole of the rim, wherein the centering elements are guided over the entire contact flange in the radial direction and wherein the contact flange extends inwardly in a radial direction from an outside edge of the contact flange to the clamping sleeve, and further wherein the contact flange has radial grooves or groove-like recesses on the side of the rim extending over the entire contact flange in the radial direction adapted for guiding the centering elements,
wherein the clamping angle between the tension lever and the centering element is between 10° and 20° when the centering element is arranged in the maximum centering position of the centering element.

2. The clamping device as set forth in claim 1, wherein each centering element is connected to the clamping sleeve by the at least one tension lever.

3. The clamping device as set forth in claim 1, wherein the contact flange has radial grooves on the side of the rim extending over the entire contact flange in the radial direction for guiding the centering elements.

4. The clamping device as set forth in claim 1, wherein each centering element has an elongated guide section guided on the contact flange and a centering section lying radially on the inside with respect to the guide section bent downward in the axial direction for centering engagement in the centering hole, with an outer surface of the guide section and a contact surface of the contact flange being aligned with each other or with the contact surface of the contact flange protruding forward with respect to the outer surface of the guide section.

5. The clamping device as set forth in claim 1, wherein the tension lever is hinged with one end on the radially outside end of the centering element and with the other end on the clamping sleeve.

6. The clamping device as set forth in claim 1, wherein the clamping sleeve has an external thread section for screwing on a clamping screw and that the axial distance between the external thread section and axial front surfaces at centering sections of the centering elements is less than 40 mm when the centering elements are arranged in the maximum centering position.

7. A clamping device with hub centering for attachment of an automobile wheel to the shaft of a balancing machine, with a contact flange with several centering elements guided in a radially moveable manner on the contact flange for centering engagement in a centering hole of the rim of the automobile wheel, and with a clamping sleeve guided in a moveable manner axially to the contact flange, wherein the clamping sleeve and the centering elements are kinematically coupled such that an axial movement of the clamping sleeve leads to a radial movement of the centering elements, wherein at least one tension lever hinged on the clamping sleeve and a centering element for the kinematic coupling of clamping sleeve and centering element, with the clamping sleeve able to be pulled in the direction of the rim when tightening the rim against the contact flange and the centering element thus able to be displaced outwardly, and with the centering element having a centering section with a radially outside outer surface for abutting in a centering manner against the inner surface of the centering hole of the rim, wherein the centering elements are guided over the entire contact flange in the radial direction and wherein the contact flange extends inwardly in a radial direction from an outside edge of the contact flange to the clamping sleeve, and further wherein the contact flange has radial grooves or groove-like recesses on the side of the rim extending over the entire contact flange in the radial direction adapted for guiding the centering elements, wherein a first tube part that can be connected in a fixed manner to the shaft of the balancing machine is provided, with the contact flange being connected in a fixed manner to the first tube part and the clamping sleeve being guided in an axially moveable manner over at least one sliding section on the first tube part, that an adjustment means for the presetting of the centering position of the centering elements that can be moved relative to the clamping sleeve and supported against the first tube part is provided within the clamping sleeve, and that a second tube part that can be screwed into the clamping sleeve is provided as an adjustment means.

8. The clamping device as set forth in claim 7, wherein a screw passing through the first tube part for connecting to the shaft of the balancing machine is provided, with an external thread section of the screw and an external thread section of the second tube part having the same thread pitch and with the screw and the second tube part able to be jointly adjusted in the axial direction.

9. A clamping device with hub centering for attachment of an automobile wheel to the shaft of a balancing machine, with a contact flange with several centering elements guided in a radially moveable manner on the contact flange for centering engagement in a centering hole of the rim of the automobile wheel, and with a clamping sleeve guided in a moveable manner axially to the contact flange, wherein the clamping sleeve and the centering elements are kinematically coupled such that an axial movement of the clamping sleeve leads to a radial movement of the centering elements, wherein at least one tension lever hinged on the clamping sleeve and a centering element is provided for the kinematic coupling of the clamping sleeve and the centering element, with the clamping sleeve able to be pulled in the direction of the rim when tightening the rim against the contact flange and the centering element thus able to be displaced outwardly, and with the centering element having a centering section with a radially outside outer surface for abutting in a centering manner against the inner surface of the centering hole of the rim, wherein the lever connection between the clamping sleeve and the centering element is an opening in the contact flange, so that the tension lever is guided through the back side of the contact flange facing away from the rim.

\* \* \* \* \*